Patented Apr. 16, 1946

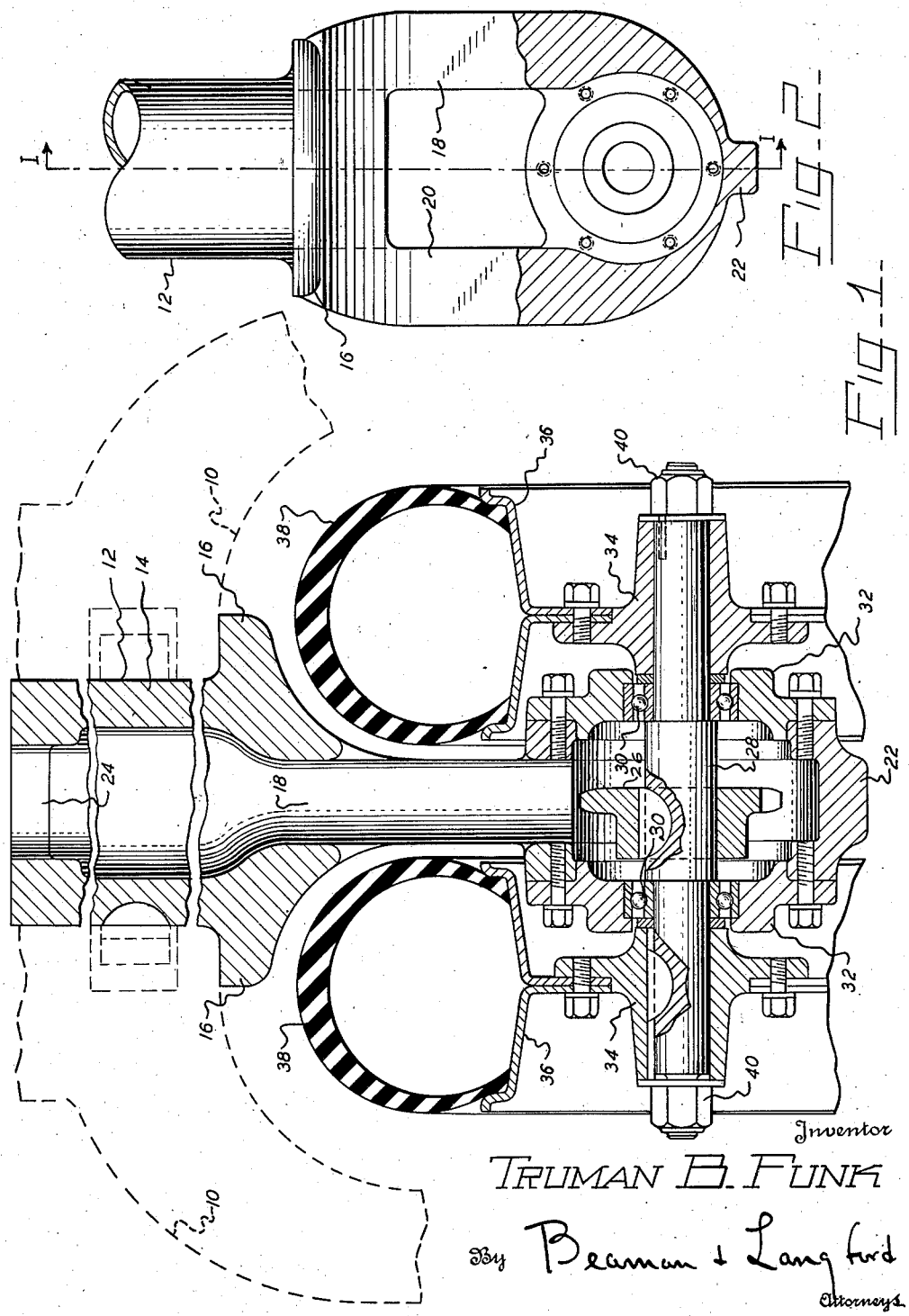

2,398,498

UNITED STATES PATENT OFFICE 2,398,498

STEERING COLUMN CONSTRUCTION FOR INDUSTRIAL TRUCKS

Truman B. Funk, Jackson, Mich., assignor to Yard-Man, Inc., Jackson, Mich., a corporation of Michigan Application December 26, 1942, Serial No. 470,165

2 Claims. (Cl. 180—42)

The present invention relates to improvements in driving and steering column construction for vehicles, having particular application to vehicles of the type disclosed in my copending application Serial No. 453,943, filed August 7, 1942.

One of the objects of the invention is to provide a steering and driving column construction of such a design that the ground wheel may be readily removed in service.

Another object of the invention is to provide a steering and driving column of the type described of simple and compact construction.

A further object is to provide a steering and driving column of the type described in which the supporting column is so designed as to afford a housing for the drive mechanism permitting a pair of ground wheels to be mounted directly adjacent the vertical axis of rotation of the column.

These and other objects and advantages residing in the combination, arrangement and construction of the parts will more fully appear from consideration of the detailed description as follows and from the annexed claims.

In the drawing,

Fig. 1 is a vertical cross-sectional view through one form of assembled steering and driving column according to the present invention taken on line I—I of Fig. 2, and Fig. 2 is a fragmentary side elevational view of the casting partly shown in broken cross section.

Referring to the drawing, the main structure in which the improved steering and driving column is used is shown in dotted outline and indicated generally with reference character 10. One specific form of the main structure is illustrated in the aforesaid application. The steering and driving column 12 comprises a central cast metal structure having an upper cylindrical formed post member 14 supported for swivel movement in the structure 10. At the lower end of the post portion 14 is a thrust flange 16. Below flange 16, the casting has been narrowed and elongated as more clearly shown in Fig. 2 into spaced vertical portions 18 and 20, which merge at the lower end into a housing 22.

At its upper end the post 12 has a bridging web 24 which is straddled by a sprocket chain or other suitable driving member running over the sprocket 26. The web 24 has a reinforcing function as well as the function of serving as a center in machining the cast structure.

The sprocket 26 is keyed to the drive axle 28 which is supported for rotation in bearings 30 carried by the plates 32 bolted to the opposite sides of the housing 22. Keyed to opposite ends of the drive shaft 28 are hubs 34 carrying sheet metal rims 36 upon which pneumatic tires 38 are mounted.

As should be apparent from Fig. 1, the aforesaid arrangement permits the mounting of the wheels directly adjacent the center of rotation of the steering and driving column. At the same time either or both wheels may be conveniently dismounted or mounted on the drive shaft 28 through the removal of the nuts 40 threaded upon the opposite ends of the drive shaft 28. As more clearly illustrated in our aforesaid application, a ring gear is shown in dotted outline, for steering through rotation of the post 12.

Having thus described my invention, what I desire to secure by Letters Patent and claim is:

1. A steering and driving column construction of the type described comprising a vertical body structure having a generally cylindrical upper end portion for swivel mounting and a load supporting flange, an intermediate portion narrowed in one direction having its structure principally distributed at opposite sides of its vertical axis and in its narrowed direction to give wheel clearance upon opposite sides thereof, a lower end in the form of a housing, an axial chamber opening into said housing and extending through said intermediate portion as an oblong chamber and into said upper portion to provide clearance for a vertical endless drive member, a horizontal drive shaft supported in said housing, and ground wheels supported on said axle and having their peripheral inner side portions directly adjacent said narrowed intermediate portion.

2. A cast metal steering and driving column construction of the type described comprising an integral main body structure having an upper end portion shaped for swivel mounting and having a load supporting part, an intermediate portion narrowed in one direction having its structure principally distributed at opposite sides of its vertical axis and in its narrowed direction to give wheel clearance on opposite sides thereof, a lower end in the form of a housing, an axial chamber opening into said housing and extending through said intermediate portion as an oblong chamber and into said upper portion to provide clearance for an endless drive member, said housing being adapted to receive the drive axle to support ground wheels on opposite sides of said narrowed intermediate portion.

TRUMAN B. FUNK.